US006900959B1

United States Patent
Gardner et al.

(10) Patent No.: US 6,900,959 B1
(45) Date of Patent: May 31, 2005

(54) DISK DRIVE COMPRISING AN OFFSET-NULLING AMPLIFIER FOR DETECTING A BACK EMF VOLTAGE OF A VOICE COIL MOTOR

(75) Inventors: Norman D. Gardner, Aliso Viejo, CA (US); Robert P. Ryan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 162 days.

(21) Appl. No.: 10/405,013

(22) Filed: Mar. 31, 2003

(51) Int. Cl.[7] .............................................. G11B 5/596
(52) U.S. Cl. ..................................... 360/78.04; 360/75
(58) Field of Search .............................. 360/61, 69, 75, 360/77.02, 78.04, 78.09, 78.12; 318/590, 599, 615; 330/9; 324/177

(56) References Cited

U.S. PATENT DOCUMENTS 5,844,743 A * 12/1998 Funches .................. 360/78.04
6,081,112 A    6/2000 Carobolante et al.
6,097,564 A    8/2000 Hunter
6,262,626 B1   7/2001 Bakker et al.

* cited by examiner

Primary Examiner—Andrew L. Sniezek
Assistant Examiner—Mitchell Slavitt
(74) Attorney, Agent, or Firm—Milad G. Shara, Esq.; Howard H. Sheerin, Esq.

(57) ABSTRACT

A disk drive is disclosed employing an offset-nulling amplifier for detecting a back EMF voltage of a voice coil motor (VCM) in a velocity mode servo control system. The offset-nulling amplifier comprises a differential amplifier, an input stage for swapping the polarity of the input voltage at a periodic interval, and an output stage comprising a single-ended amplifier having an input switched at the periodic interval between the positive and negative outputs of the differential amplifier.

9 Claims, 3 Drawing Sheets

DISK DRIVE COMPRISING AN OFFSET-NULLING AMPLIFIER FOR DETECTING A BACK EMF VOLTAGE OF A VOICE COIL MOTOR

CROSS REFERENCE TO RELATED APPLICATIONS AND PATENTS

This application is related to co-pending U.S. patent application Ser. No. 09/704,175 entitled "DISK DRIVE EMPLOYING VCM DEMAND CURRENT TO CALIBRATE VCM IR VOLTAGE FOR VELOCITY CONTROL OF AN ACTUATOR ARM", and Ser. No. 09/703,689 entitled "DISK DRIVE COMPRISING VCM STALL DETECTOR FOR VELOCITY CONTROL OF ACTUATOR ARM", the disclosures of which are incorporated herein by reference.

BACKGROUND OF THE INVENTION

1. Field of the Invention

The present invention relates to disk drives. More particularly, the present invention relates to a disk drive comprising an offset-nulling amplifier for detecting a back EMF voltage of a voice coil motor.

2. Description of the Prior Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

There are times when the servo control system does not have access to the embedded servo sectors yet it is still desirable to control the velocity of the actuator arm. For example, in disk drives wherein the head is parked on a landing-zone of the disk, it is desirable to control the velocity of the actuator arm to unlatch the head during spin-up. In disk drives employing ramp loading/unloading, it is desirable to control the velocity of the actuator arm so that the head is not damaged as it travels off the ramp onto the disk as well as off the disk onto the ramp. Another example is if the servo control system loses servo sector synchronization it is desirable to control the velocity of the actuator arm to facilitate re-synchronizing to the servo sectors.

Prior art techniques for controlling the velocity of the actuator arm when servo sector information is unavailable include using a voltage loop with the detected back EMF voltage generated by the VCM as the feedback. The voltage across the voice coil (the voice coil voltage) comprises a component due to the inductance L of the VCM, a component due to the resistance R of the VCM, and a component due to the velocity of the VCM referred to as the back EMF voltage. If the component due to the resistance R is canceled from the voice coil voltage, at low frequencies Ldi/dt is small leaving the back EMF voltage due to the velocity of the VCM as the dominant component.

A differential operational amplifier (op-amp) has typically been used to detect the back EMF voltage; however, the input offset voltage of a differential op-amp can distort the back EMF measurement. A known technique for nulling the input offset voltage involves shorting the inputs to the differential op-amp during a calibration interval in order to measure the input offset voltage. The stored input offset voltage is then used to adjust the output of the differential op-amp during normal operation. This technique is undesirable, however, since the input offset voltage must be calibrated periodically which can interfere with the normal operation of the disk drive.

There is, therefore, a need to improve the back EMF voltage measurement of a VCM in order to improve the velocity control mode of a disk drive.

SUMMARY OF THE INVENTION

The present invention may be regarded as a disk drive comprising a disk, a head, and a voice coil motor (VCM) comprising a voice coil for actuating the head radially over the disk, the voice coil comprising a first end and a second end. The disk drive further comprises a first offset-nulling amplifier for detecting a voice coil voltage across the voice coil, the voice coil voltage comprising a component due to a resistance of the voice coil and a back EMF component due to a velocity of the VCM. The first offset-nulling amplifier comprises a differential amplifier having a first input and a second input and a first output and a second output. The first offset-nulling amplifier further comprises an input stage and an output stage. The input stage comprises a plurality of input switches for periodically configuring the input stage between a first state and a second state. While in the first state the first end of the voice coil is connected to the first input of the differential amplifier and the second end of the voice coil is connected to the second input of the differential amplifier. While in the second state the first end of the voice coil is connected to a the second input of the differential amplifier and the second end of the voice coil is connected to the first input of the differential amplifier. The output stage comprises a single-ended amplifier and a plurality of output switches. While the input stage is in the first state, the output switches connect an input of the single-ended amplifier to the first output of the differential amplifier. While the input stage is in the second state, the output switches connect the input of the single-ended amplifier to the second output of the differential amplifier. An output of the single-ended amplifier represents the voice coil voltage. The disk drive further comprises a current detector for detecting a coil current flowing through the voice coil, and an IR voltage detector, responsive to the coil current, for detecting a resistive voltage due to the resistance of the voice coil. A voltage compensator subtracts the resistive voltage from the voice coil voltage to generate a back EMF voltage, and a control voltage generator, responsive to a command input and the back EMF voltage, generates a control voltage applied to the voice coil.

In one embodiment, the disk drive generates a clock signal for controlling the input switches and the output switches, wherein the clock signal comprises a substantially fifty percent duty cycle. In one embodiment, the disk drive comprises a disk controller for disabling the clock signal and controlling the input switches and output switches directly during a calibration mode.

In another embodiment, the current detector comprises a sense resistor in series with the voice coil and a second offset-nulling amplifier for amplifying a voltage across the sense resistor. In yet another embodiment, the IR voltage detector comprises a calibrated resistor responsive to the output of the second offset-nulling amplifier and a third offset-nulling amplifier for amplifying a voltage across the calibrated resistor. In still another embodiment, the voltage compensator comprises a fourth offset-nulling amplifier responsive to the output of the first offset-nulling amplifier and the third offset-nulling amplifier.

The present invention may also be regarded as a method of operating a disk drive, the disk drive comprising a disk, a head, a voice coil motor (VCM) comprising a voice coil for actuating the head radially over the disk, the voice coil comprising a first end and a second end. A voice coil voltage is detected across the voice coil, wherein the voice coil voltage comprises a component due to a resistance of the voice coil and a back EMF component due to a velocity of the VCM. A plurality of input switches are configured into a first state to connect the first end of the voice coil to a first input of a differential amplifier and the second end of the voice coil to a second input of the differential amplifier. The plurality of input switches are configured into a second state to connect the second end of the voice coil to the first input of the differential amplifier and the first end of the voice coil to the second input of the differential amplifier. An input of a single-ended amplifier is connected to a first output of the differential amplifier while the input switches are in the first state, and the input of the single-ended amplifier is connected to a second output of the differential amplifier while the input switches are in the second state. The voice coil voltage is detected from an output of the single-ended amplifier. A coil current flowing through the voice coil is detected, and a resistive voltage is detected proportional to the coil current flowing through a resistance of the voice coil. The resistive voltage is subtracted from the voice coil voltage to generate a back EMF voltage. A control voltage is generated in response to a command input and the back EMF voltage, and the control voltage is applied to the voice coil.

DESCRIPTION OF THE PREFERRED EMBODIMENTS

Figure 1:
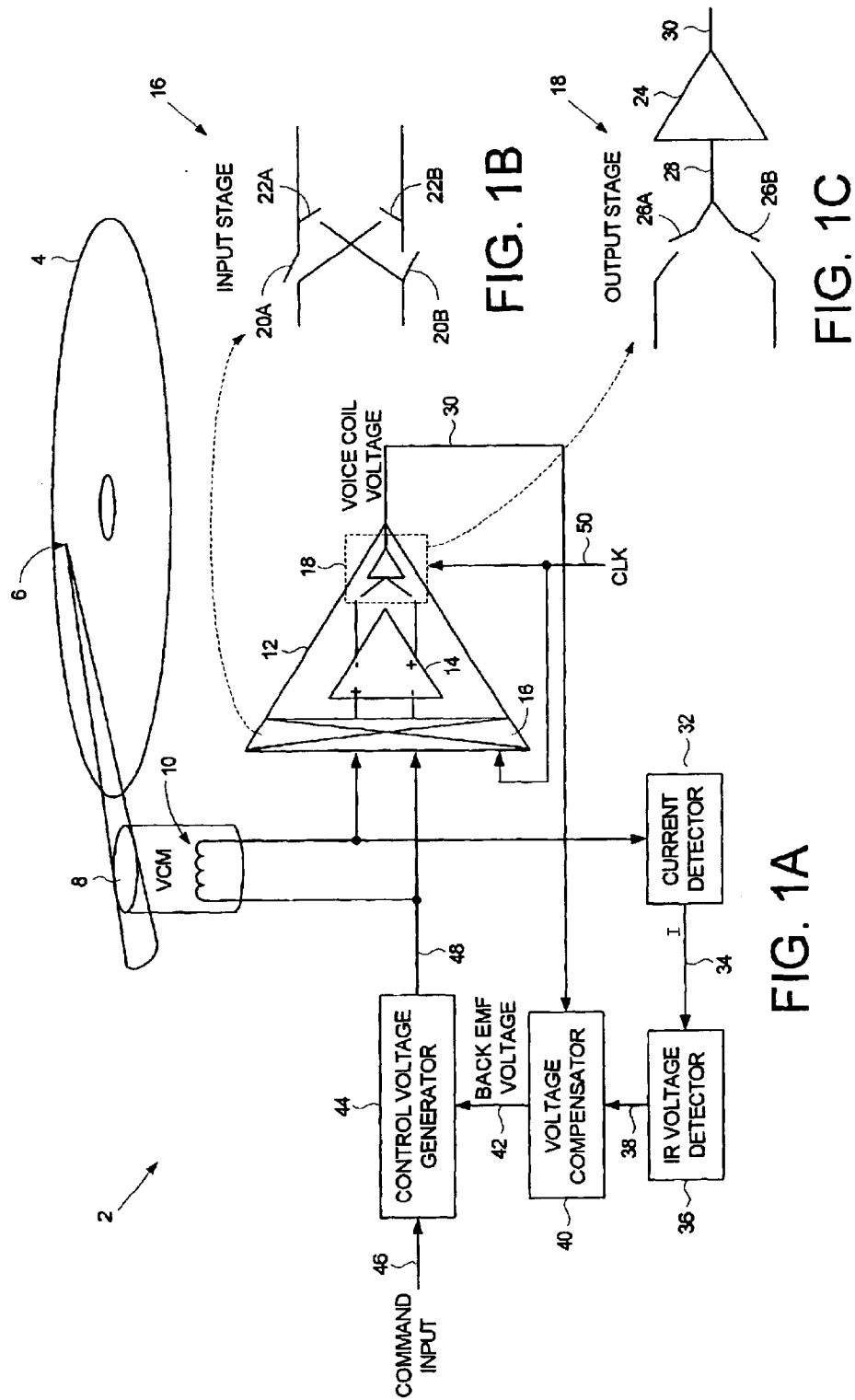
FIG. 1A shows a disk drive according to an embodiment of the present invention comprising an offset-nulling amplifier for detecting a voice coil voltage across a voice coil of a VCM, the offset-nulling amplifier having an input stage of switches and an output stage of switches for canceling an input offset of a differential amplifier.
FIG. 1B shows the input stage comprising a plurality of input switches for swapping the inputs to the differential amplifier according to an embodiment of the present invention.
FIG. 1C shows the output stage comprising a plurality of output switches for connecting the input of a single-ended amplifier to a first or second output of the differential amplifier.

FIG. 1A shows a disk drive 2 according to an embodiment of the present invention comprising a disk 4, a head 6, and a voice coil motor (VCM) 8 comprising a voice coil 10 for actuating the head 6 radially over the disk 4, the voice coil 10 comprising a first end and a second end. The disk drive 2 further comprises an offset-nulling amplifier 12 for detecting a voice coil voltage 30 across the voice coil 10, the voice coil voltage 30 comprising a component due to a resistance of the voice coil 10 and a back EMF component due to a velocity of the VCM 8. The offset-nulling amplifier 12 comprises a differential amplifier 14 comprising a first input and a second input and a first output and a second output. The offset-nulling amplifier 12 further comprises an input stage 16 and an output stage 18.

As shown in FIG. 1B, the input stage 16 comprises a plurality of input switches 20A, 20B, 22A and 22B for periodically configuring the input stage 16 between a first state and a second state. While in the first state the first end of the voice coil 10 is connected to the first input of the differential amplifier 14 and the second end of the voice coil 10 is connected to the second input of the differential amplifier 14. For example, input switches 20A and 20B are switched on and input switches 22A and 22B are switched off. While in the second state the first end of the voice coil 10 is connected to the second input of the differential amplifier 14 and the second end of the voice coil 10 is connected to the first input of the differential amplifier 14. For example, input switches 22A and 22B are switched on and input switches 20A and 20B are switched off.

As shown in FIG. 1C, the output stage 18 comprises a single-ended amplifier 24 (such as a buffer) and a plurality of output switches 26A and 26B. While the input stage 16 is in the first state, the output switches 26A and 26B connect an input 28 of the single-ended amplifier 24 to the first output of the differential amplifier 14. For example, output switch 26A is switched on and output switch 26B is switched off. While the input stage 16 is in the second state, the output switches 26A and 26B connect the input 28 of the single-ended amplifier 24 to the second output of the differential amplifier 14. For example, output switch 26B is switched on and output switch 26A is switched off. An output of the single-ended amplifier 24 represents the voice coil voltage 30.

The disk drive 2 of FIG. 1A further comprises a current detector 32 for detecting a coil current 34 flowing through the voice coil 10, and an IR voltage detector 36, responsive to the coil current 34, for detecting a resistive voltage 38 due to the resistance of the voice coil 10. A voltage compensator 40 subtracts the resistive voltage 38 from the voice coil voltage 30 to generate a back EMF voltage 42, and a control voltage generator 44, responsive to a command input 46 and the compensated back EMF voltage 42, generates a control voltage 48 applied to the voice coil 10.

A clock signal 50 controls the switching operation of the input stage 16 and the output stage 18. In one embodiment, the clock signal 50 comprises a substantially 50% duty cycle so that the ends of the voice coil 10 are alternately switched between the inputs of the differential amplifier 14. A suitable frequency is selected for the clock signal 50 compared to the time constant of the mechanical servo system so that on average the input offset voltage of the differential amplifier 14 is effectively canceled. This is better understood from the following equations which define the output of the offset-nulling amplifier 12:

G1: gain of the differential amplifier 14;
G2: gain of the single-ended amplifier 24;
Voffset: input offset voltage of the differential amplifier 14;
Vin: input voltage to the differential amplifier 14;
Vout1: output of the single-ended amplifier 24 while the input stage 16 is in the first state;

Vout2: output of the single-ended amplifier 24 while the input stage 16 is in the second state;

$$Vout1=Vin(G1)(G2)+Voffset(G1)(G2);$$

$$Vout2=Vin(-G1)(-G2)+Voffset(G1)(-G2);$$

$$(Vout1+Vout2)/2=Vin(G1)(G2).$$

As illustrated by the above equations, the input stage 16 of the offset-nulling amplifier 12 switches the polarity of the input voltage Vin without switching the polarity of the input offset voltage Voffset. Therefore the input offset voltage Voffset appears at the output of the single-ended amplifier 24 as an oscillation that averages to zero.

Figure 2:
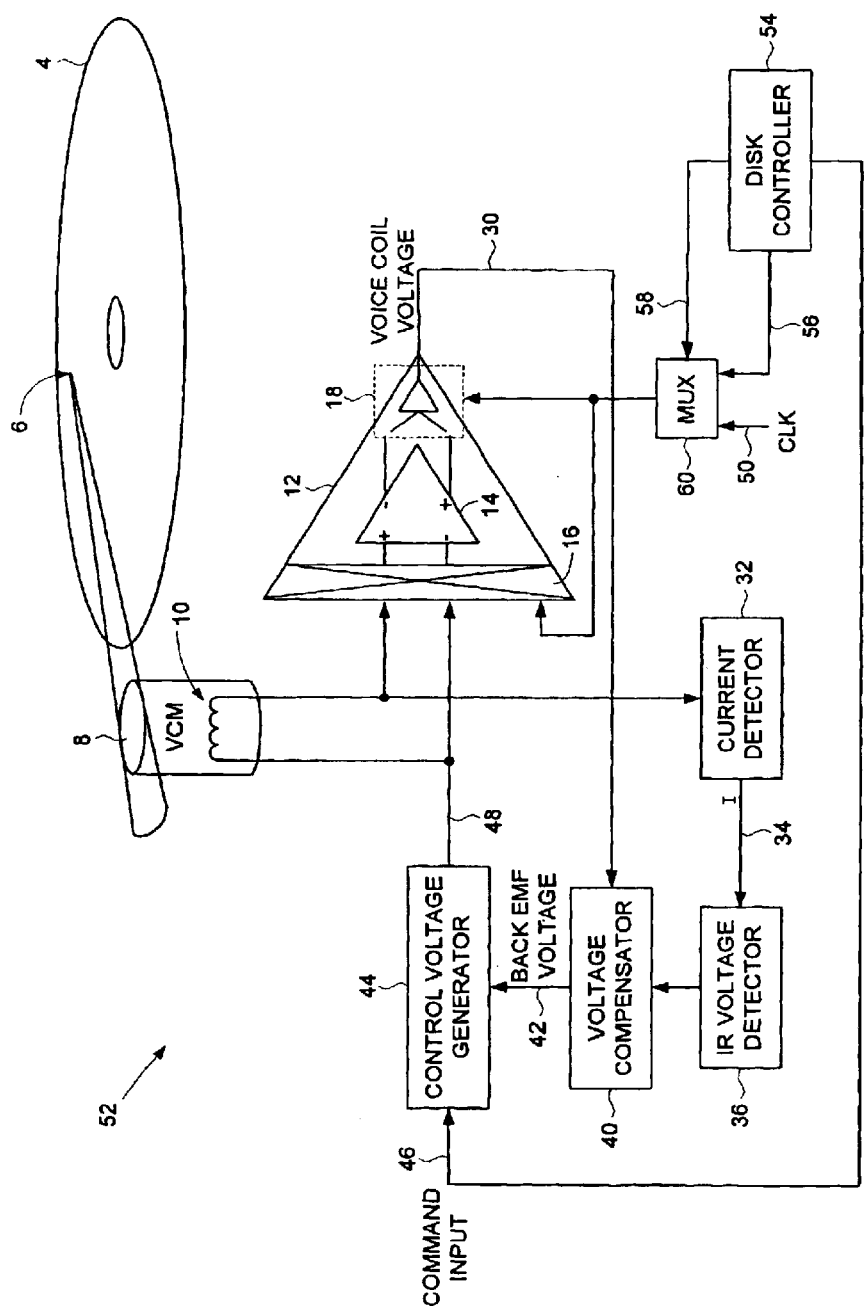
FIG. 2 shows a disk drive according to an embodiment of the present invention comprising a disk controller for disabling the clock signal and controlling the input switches and output switches directly during a calibration mode.

FIG. 2 shows a disk drive 52 according to an embodiment of the present invention further comprising a disk controller 54 for disabling the clock signal 50 and controlling the input switches of the input stage 16 and the output switches of the output stage 18 directly during a calibration mode. The disk controller 54 generates a switch control signal 56 and selects (over line 58) the switch control signal 56 as the output of multiplexer 60. In one embodiment, the disk controller 54 also configures the disk drive into a position control mode wherein embedded servo sectors recorded on the surface of the disk 4 are used to control the VCM 8, and a velocity control mode wherein the detected back EMF voltage 42 is used to control the VCM 8 (e.g., during ramp load/unload).

Figure 3:
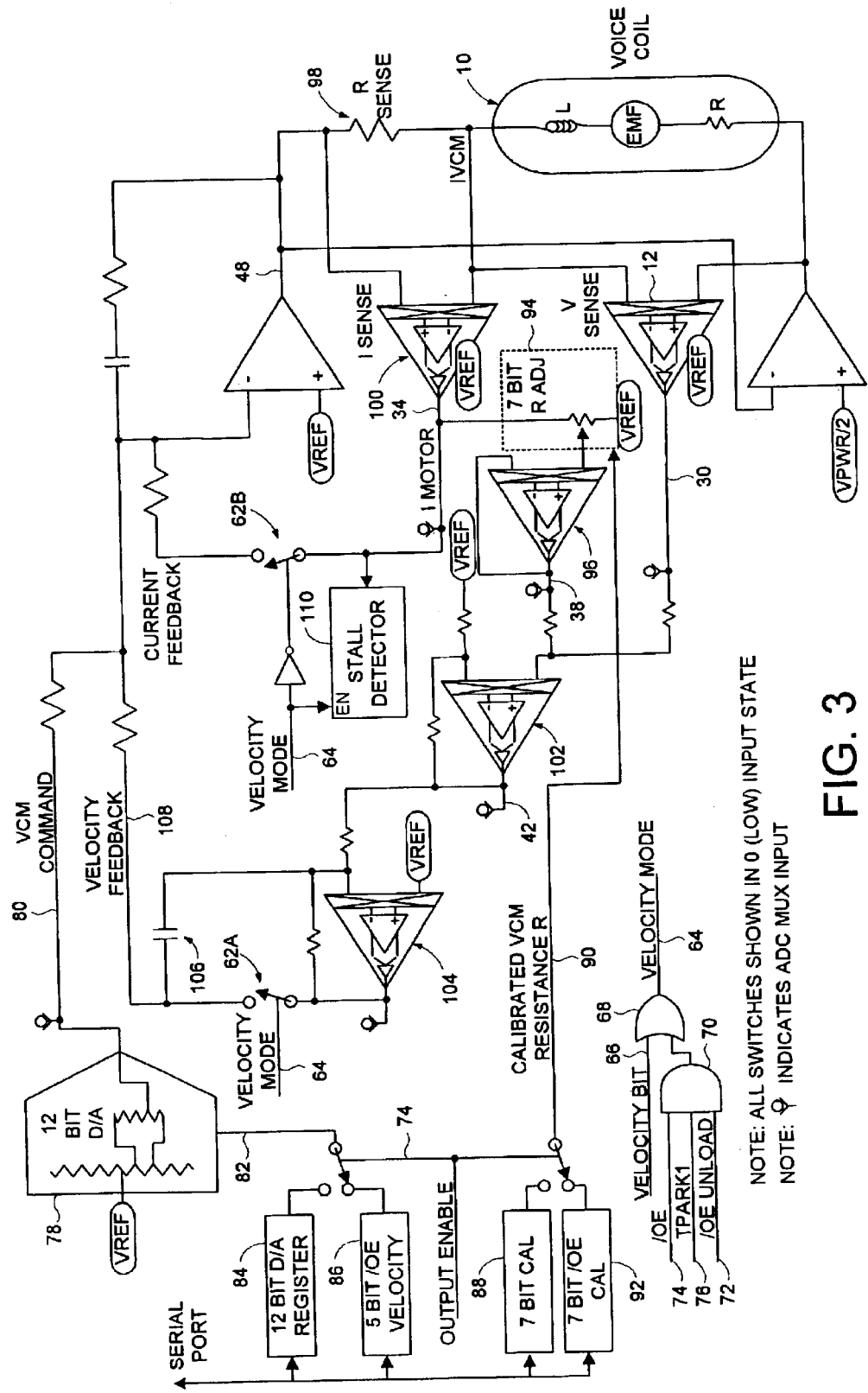
FIG. 3 shows a more detailed embodiment of the present invention for implementing the voice coil current detector, IR voltage detector, and back EMF voltage compensator of FIG. 1A.

FIG. 3 shows a more detailed embodiment of the present invention for implementing the current detector 32, IR voltage detector 36, and voltage compensator 40 of FIG. 1A using offset-nulling amplifiers. The circuit of FIG. 3 operates in a position control mode wherein the VCM 8 is driven by a current controlled feedback loop, and in a velocity control mode wherein the VCM 8 is driven by a voltage controlled feedback loop. When in the position control mode, switch 62A is opened and switched 62B is closed to configure the current feedback loop, and when in the velocity control mode, switch 62A is closed and switch 62B is opened to configure the voltage feedback loop. A velocity mode control signal 64 configures the switches 62A and 62B for velocity control mode when the embedded servo sectors are not available for servo controlling the VCM 8. A velocity bit 66 may be set by the disk controller 54 (FIG. 2) to activate the velocity mode control signal 64 via OR gate 68. The velocity bit 66 may be set during specific modes of operation, such as during a load/unload operation or when synchronization to the embedded servo sectors is lost. The velocity mode control signal 64 may also be activated via AND gate 70 and OR gate 68 during power down or power failure. If the OE UNLOAD signal 72 has been preset to configure the drive for velocity mode unload, when a power down or power failure is detected, the control signals OUTPUT ENABLE (OE) 74 and TPARK1 76 are automatically activated, thereby activating the velocity mode control signal 64.

A digital-to-analog (D/A) converter 78 generates an analog VCM command signal 80 in response to a digital command input signal 82. A digital register 84 is programmed with an operating command input 46 (FIG. 1A) during normal operation, and with a calibration command input when calibrating the IR voltage detector 36. A digital register 86 is programmed with a, command input value used during power down or power failure to park the head 6. A digital register 88 stores a calibrated VCM resistance R value 90 for use during velocity control mode when the velocity bit 66 is activated (e.g., when calibrating the IR voltage detector 36). After calibrating the IR voltage detector 36 a digital register 92 stores the calibrated VCM resistance R value 90 for use during power down or power failure.

The VCM resistance R value 90 adjusts a programmable resistor 94 to vary a resistance associated with an input voltage to an offset-nulling amplifier 96. A sense resistor 98 and an offset-nulling amplifier 100 implement a suitable current detector 32 (FIG. 1A) for generating a voltage representing the current I 34 flowing through the voice coil 10. With the voltage representing the current I 34 applied to the programmable resistor 94, the output of the offset-nulling amplifier 96 is the calibrated IR voltage 38. The offset-nulling amplifier 12 measures the voice coil voltage 30 across the voice coil 10. The IR voltage 38 is subtracted from the measured voice coil voltage 30 such that the output voltage of offset-nulling amplifier 102 is the detected back EMF voltage 42. The back EMF voltage 42 is amplified by offset-nulling amplifier 102, and filtered by offset-nulling amplifier 104 and capacitor 106 to generate a velocity feed back voltage 108 representing the velocity of the VCM 8. The velocity feedback voltage 108 is subtracted from the VCM command signal 80 to generate the control voltage 49 applied to the voice coil 10.

A stall detector 110 monitors the current I 34 flowing through the voice coil 10 to detect when the VCM 8 has stalled. Further details describing the operation of the circuitry disclosed in FIG. 3 for calibrating the IR voltage detector 36 using the stall detector 110 are disclosed in the above referenced U.S. patent applications entitled "DISK DRIVE EMPLOYING VCM DEMAND CURRENT TO CALIBRATE VCM IR VOLTAGE FOR VELOCITY CONTROL s OF AN ACTUATOR ARM" and "DISK DRIVE COMPRISING VCM STALL DETECTOR FOR VELOCITY CONTROL OF AN ACTUATOR ARM".

We claim:

1. A disk drive comprising:
   (a) a disk;
   (b) a head;
   (c) a voice coil motor (VCM) comprising a voice coil for actuating the head radially over the disk, the voice coil comprising a first end and a second end;
   (d) a first offset-nulling amplifier for detecting a voice coil voltage across the voice coil, the voice coil voltage comprising a component due to a resistance of the voice coil and a component due to a velocity of the VCM, the first offset-nulling amplifier comprising:
      a differential amplifier comprising a first input and a second input and a first output and a second output;
      an input stage responsive to the first and second ends of the voice coil, the input stage comprising a plurality of input switches for periodically configuring the input stage between a first state and a second state, wherein:
         while in the first state the first end of the voice coil is connected to the first input of the differential amplifier and the second end of the voice coil is connected to the second input of the differential amplifier; and
         while in the second state the first end of the voice coil is connected to the second input of the differential amplifier and the second end of the voice coil is connected to the first input of the differential amplifier; and
      an output stage comprising a single-ended amplifier and a plurality of output switches, the plurality of output switches for:
         connecting an input of the single-ended amplifier to the first output of the differential amplifier while the input stage is in the first state;

connecting the input of the single-ended amplifier to the second output of the differential amplifier while the input stage is in the second state;

wherein an output of the single-ended amplifier represents the voice coil voltage;

(e) a current detector for detecting a coil current flowing through the voice coil, (f) an IR voltage detector, responsive to the coil current, for detecting a resistive voltage due to the resistance of the voice coil;

(g) a voltage compensator for subtracting the resistive voltage from the voice coil voltage to generate a back EMF voltage; and (h) a control voltage generator, responsive to a command input and the back EMF voltage, for generating a control voltage applied to the voice coil.

2. The disk drive as recited in claim 1, further comprising a clock signal for controlling the input switches and the output switches, wherein the clock signal comprises a substantially fifty percent duty cycle.

3. The disk drive as recited in claim 2, further comprising a disk controller for disabling the clock signal and controlling the input switches and output switches directly during a calibration mode.

4. The disk drive as recited in claim 1, wherein the current detector comprises a sense resistor in series with the voice coil and a second offset-nulling amplifier for amplifying a voltage across the sense resistor.

5. The disk drive as recited in claim 4, wherein the IR voltage detector comprises a calibrated resistor responsive to the output of the second offset-nulling amplifier and a third offset-nulling amplifier for amplifying a voltage across the calibrated resistor.

6. The disk drive as recited in claim 5, wherein the voltage compensator comprises a fourth offset-nulling amplifier responsive to the output of the first offset-nulling amplifier and the third offset-nulling amplifier.

7. A method of operating a disk drive, the disk drive comprising a disk, a head, a voice coil motor (VCM) comprising a voice coil for actuating the head radially over the disk, the voice coil comprising a first end and a second end, the method comprises the steps of:

(a) detecting a voice coil voltage across the voice coil, the voice coil voltage comprising a component due to a resistance of the voice coil and a back EMF component due to a velocity of the VCM, the step of detecting the voice coil voltage comprising the steps of:

configuring a plurality of input switches into a first state to connect the first end of the voice coil to a first input of a differential amplifier and the second end of the voice coil to a second input of the differential amplifier, configuring the plurality of input switches into a second state to connect the second end of the voice coil to the first input of the differential amplifier and the first end of the voice coil to the second input of the differential amplifier;

connecting an input of a single-ended amplifier to a first output of the differential amplifier while the input switches are in the first state;

connecting the input of the single-ended amplifier to a second output of the differential amplifier while the input switches are in the second state; and detecting the voice coil voltage from an output of the single-ended amplifier;

(b) detecting a coil current flowing through the voice coil;

(c) detecting a resistive voltage proportional to the coil current flowing through a resistance of the voice coil;

(d) subtracting the resistive voltage from the voice coil voltage to generate a back EMF voltage;

(e) generating a control voltage in response to a command input and the back EMF voltage; and (f) applying the control voltage to the voice coil.

8. The method as recited in claim 7, further comprising the step of generating a clock signal for controlling the input switches and the output switches, wherein the clock signal comprises a substantially fifty percent duty cycle.

9. The method as recited in claim 8, further comprising the step of disabling the clock signal and controlling the input switches and output switches directly during a calibration mode.

* * * * *